(12) United States Patent
Richards et al.

(10) Patent No.: US 9,407,578 B2
(45) Date of Patent: Aug. 2, 2016

(54) SYSTEM AND METHOD OF ARBITRATING ACCESS TO INTERCONNECT

(71) Applicant: Imagination Technologies Limited, Kings Langley (GB)

(72) Inventors: Joseph M. Richards, San Francisco, CA (US); Jason Rupert Redgrave, Mountain View, CA (US); Steven John Clohset, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 576 days.

(21) Appl. No.: 13/794,806

(22) Filed: Mar. 12, 2013

(65) Prior Publication Data
US 2014/0269760 A1 Sep. 18, 2014

(51) Int. Cl.
*H04L 12/70* (2013.01)
*H04L 12/937* (2013.01)
(52) U.S. Cl.
CPC ............ *H04L 49/254* (2013.01); *H04L 49/253* (2013.01)
(58) Field of Classification Search
None
See application file for complete search history.

(56) References Cited

U.S. PATENT DOCUMENTS

| 7,796,629 | B1 * | 9/2010 | MacAdam | H04L 47/10 370/352 |
| 8,006,025 | B2 | 8/2011 | Olesinski | |
| 8,289,989 | B1 * | 10/2012 | Gibson | 370/462 |

OTHER PUBLICATIONS

Delgado-Frias, et al. "A VLSI crossbar switch with wrapped wave front arbitration" Circuits and Systems I: Fundamental Theory and Applications, IEEE Transactions on (vol. 50, Issue: Jan. 1, 2003.
Tamir, et al. "Symmetric crossbar arbiters for VLSI communication switches" Parallel and Distributed Systems, IEEE Transactions on (vol. 4, Issue: 1) Jan. 1993.

* cited by examiner

*Primary Examiner* — Huy D Vu
*Assistant Examiner* — Hong Shao
(74) *Attorney, Agent, or Firm* — Vorys, Sater, Seymour and Pease LLP; Vincent M DeLuca (57) ABSTRACT

Aspects relate to arbitrating access to an interconnect among multiple ports. For example, input ports receive requests for access to identified destination ports and buffer these in one or more FIFOs. A picker associated with respective FIFO(s) begins an empty arbitration packet that includes a location for each output port and fills one or more locations in the packet, such as based on a prioritization scheme. Each packet is passed in a ring to another picker, which performs a fill that does not conflict with previously filled locations in that packet. Each picker has an opportunity to place requests in each of the packets. Results of the arbitration are dispatched to reorder buffers associated with respective output ports and used to schedule the interconnect. Each arbitration cycle thus produces a set of control information for an interconnect to be used in subsequent data transfer steps.

30 Claims, 8 Drawing Sheets

| 84 | 83 | 82 | 81 | |
|---|---|---|---|---|
| L3-0-T0 | L3-0-T1 | L3-0-T2 | L2-1-T2 | Bank 7 |
| L3-1-T0 | L2-0-T0 | L2-1-T1 | L3-0-T3 | Bank 6 |
| L2-0-T3 | NULL | NULL | L1-1-T1 | Bank 5 |
| L0-0-T1 | L0-0-T2 | L3-1-T2 | L0-0-T0 | Bank 4 |
| NULL | L2-1-T0 | L2-0-T1 | L0-1-T0 | Bank 3 |
| L2-1-T3 | L3-1-T1 | L0-1-T3 | L1-0-T1 | Bank 2 |
| L0-1-T1 | L0-1-T2 | L1-1-T0 | NULL | Bank 1 |
| L1-0-T2 | L1-1-T3 | L1-0-T0 | L2-0-T2 | Bank 0 |

FIG. 6

Maintain order in output queue for each input queue 92

| L1-1-T3 | L0-1-T2 |
| L1-0-T2 | L0-1-T1 |
| L1-0-T0 | L1-1-T0 |
| L2-0-T2 | NULL |
| Bank 0 | Bank 1 |

FIG. 7

NULL
L0-1-T2 — Bubble NULL slot up 93
L0-1-T1
L1-1-T0
Port 1

SYSTEM AND METHOD OF ARBITRATING ACCESS TO INTERCONNECT

BACKGROUND

1. Field

The following relates to arbitration for use of a data interconnect, and in one particular aspect, to arbitrating access to memories in distributed computation.

2. Related Art

A data switch can have multiple input ports and multiple output ports. The switch functions to receive inputs at the input ports, and determine a respective output port to which each input is to be sent. In some cases, each input port can receive inputs that may need to be sent out any one of the output ports. Inputs may be received asynchronously at the input ports, such that there may be multiple inputs that may need to be switched to the same output port; system limitations prevent all these inputs from being sent to that same output port simultaneously, resulting in a conflict. Arbitration among these conflicting inputs is conducted in order to determine a relative ordering that conflicting data transfers will be serviced.

SUMMARY

In one aspect, a method of arbitrating for access to an interconnect comprises receiving, over time, at any of n input ports, one or more data transfer requests, each specifying a respective output port, from m output ports, through which the request will be serviced. Each of the requests can be buffered. The method assigns a respective empty arbitration packet to a respective picker assigned to each of the input ports. Each arbitration packet has a location for each of the m output ports. At each of the pickers, at least one buffered request is selected and placed in the arbitration packet at that picker in the location for the output port to which each selected request is destined. The arbitration packets are passed among the pickers until each picker has received each arbitration packet, and while each picker has each arbitration packet, the picker attempts to place at least one request in any remaining location in that arbitration packet. The completed arbitration packets are applied to schedule the fulfillment of the requests using the interconnect.

Another aspect relates to an arbiter for access to an n input port by m output port interconnect that has a buffer operable to store data elements received at any of the n input ports. The arbiter also has a plurality of pickers. Each of the pickers is coupled to receive an arbitration packet from another picker. The arbitration packet comprises a location for each of the m output ports. Each picker is to attempt to fill at least one empty location in the received arbitration packet, wherein any of the pickers can fill any empty location in the received arbitration packet, and to pass the arbitration packet to another picker. The plurality of pickers completes n arbitration packets concurrently. In one approach, each of the m output ports has a respective reorder buffer for each of the m output ports operable to receive the entries in the n arbitration packets for that output port and enforce a first-in, first-out order for entries originating from the same input port.

Another aspect relates to a computing system with an interconnect having a set of ports, and a controller operable to configure the interconnect so that data transactions can occur between specified combinations of the ports. The controller is operable to receive a sequence of sets of interconnect configuration data and to configure the interconnect for a sequence of data transfer cycles according to the sets of interconnect configuration data. Each set of interconnect configuration data has indications of combinations of ports to be coupled for data transfer during a data transfer cycle when that set of interconnect configuration data is to be used. The arbiter has input ports at which requests for data transactions to occur on the interconnect are received. The arbiter also has a plurality of pickers. Each picker is coupled to a respective input port, and to communicate with a preceding picker and a subsequent picker. Each picker is for obtaining an arbitration packet during an arbitration cycle. Each arbitration packet comprises a predetermined number of slots to be populated with interconnect configuration data. Each picker populates one or more of the slots in the arbitration packet with interconnect configuration data for one or more of the requests received at the input port. The populating involves identifying any slots that already are populated with interconnect configuration data and excluding from consideration any request that requires a combination of interconnect ports that conflict with combinations of interconnect ports specified by the populated slots. Each picker transfers the arbitration packet to the subsequent picker until each picker has received each of the arbitration packets at least once. So, each picker receives an arbitration packet from the preceding picker, and repeats the populating with the received arbitration packet.

DETAILED DESCRIPTION

Figure 1:
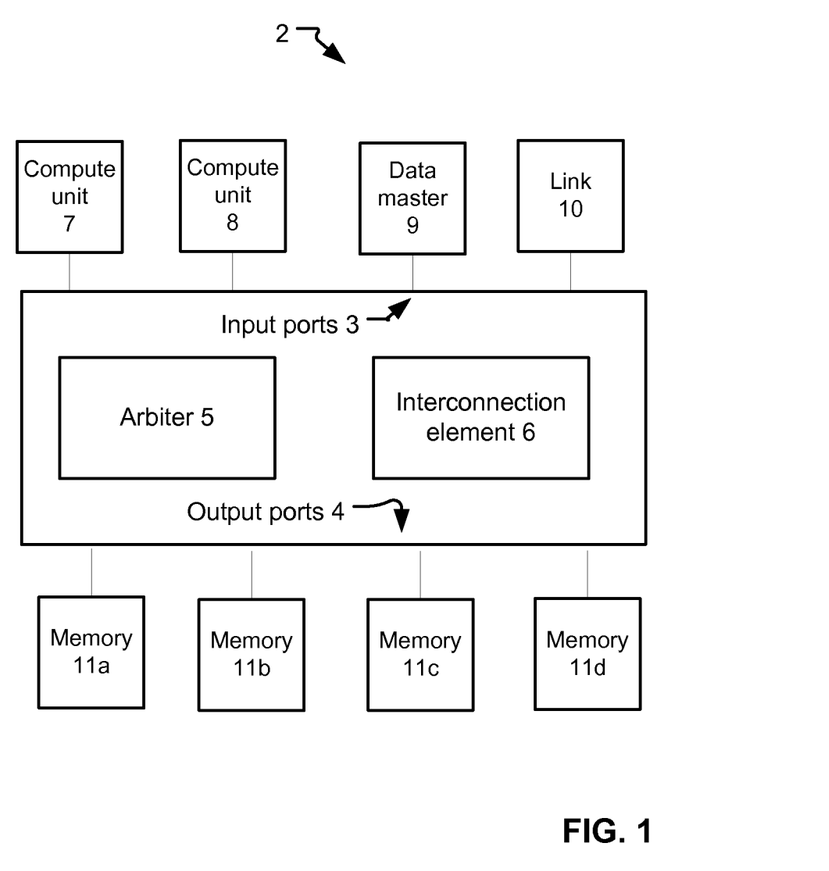
FIG. 1 depicts an example system context in which an arbiter can operate to schedule an interconnection element.

FIG. 1 depicts an example system 2 in which an arbiter 5 arbitrates access to an interconnect 6 that selectively couples different input ports 3 with different output ports 4. In the example, interconnection element 6 can connect any single input port to any single output port for each transfer cycle. So, if two input ports need the same output port, then a conflict ensues, requiring arbitration.

Various kinds of components can be coupled to input ports 3 and to output ports 4 and in example system 2, compute units 7 and 8, a data master 9, and a link 10 are coupled to input ports 3, and memories 11*a*-11*d* are coupled to output ports 4. Data master 9 represents a situation where a data master may setup memories, so that compute units can perform computation using data that was arranged in memories 11*a*-11*d* by data master 9. Link 10 can be used to connect to another arbiter/interconnection element set in order to produce a larger interconnect. Some usages of the disclosures may have only compute units coupling to inputs 3. In some situations, data master 9 may be implemented by a compute unit executing a program or by circuitry. Each input and output port shown can be implemented by one or more lanes or interconnection points. Also, input ports 3 and output ports 4 can be implemented as separate control and datapath, where control primarily is routed to arbiter 5 and datapath is routed to interconnection element 6. The control path itself transfers data representing requests for use or reservation of interconnection element 6 for a specified set of ports, while the datapath is used to transit the data being moved across the interconnect. In some examples, a single combined datapath may contain both control and data elements.

Interconnection element 6 may include a memory controller that is to receive specified information in order to setup different memory requests. The information required by the memory controller is provided by the programs or by the circuitry generating requests to use interconnection element 6 for data transfer. Different memory controllers may use different information and support different capabilities. Thus, the information arriving at the input ports would differ in these differing implementations.

The labeling of certain ports as inputs and other ports as outputs does not necessary indicate a limitation on a direction of data traffic through interconnect 6. For example, data can be transmitted from memories 11*a*-11*d* to any of the input ports 3 and vice versa, according to data transfer requests. So arbitration is determining which data ports are to be coupled for data transfer at each data transfer opportunity. Further description and examples of operation of arbiter 5 are provided below.

Figure 2:
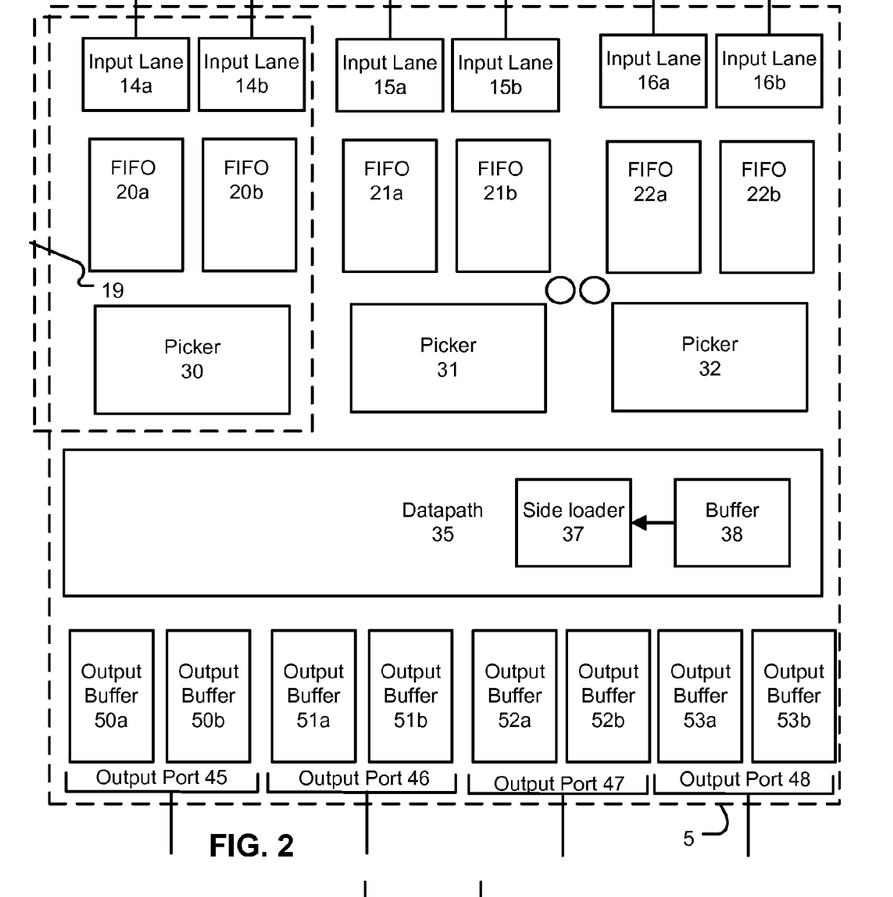
FIG. 2 depicts aspects of an example arbiter.

FIG. 2 depicts arbiter 5 having multiple input lanes for each input port of input ports 3 (14*ab*, 15*ab*, and 16*ab* are specifically identified). Each input lane 14*ab*-16*ab* is coupled to a respective FIFO buffer 20*ab*-22*ab*. A respective picker 30-32 couples with the input lanes for one of the input ports. For example, picker 30 couples to FIFOs 20*ab* for input lanes 14*ab*. A datapath 35 couples to pickers 30-32, interconnects pickers 30-32 so that pickers 30-32 are interconnected. For example, in one approach, pickers 30-32 are connected in a ring, where picker 32 is connected to a previous picker and to picker 30.

Each picker is operable to receive an arbitration packet from one picker and to send an arbitration packet to a subsequent picker. In one example, pickers 30-32 operate to synchronously pass arbitration packets from one to another. Each picker may contain a register that stores the arbitration packet for one arbitration step, with datapath 35 connecting registers of different pickers. When the registers are clocked, the arbitration packet in the register for each picker is sent to the next picker.

Datapath 35 also can include interconnect that selectively transfers portions of the arbitration packets to the output buffer to which each portion belongs. In particular, arbitration packets can include data concerning the transfer specified by each request represented in that arbitration packet, such as specifics source and/or destination addresses for reading/writing memories. So, in one example, the output buffer receives a memory address or pointer that indicates a location from which data is to be read or in which data is to be stored.

In another example, the arbitration packet includes a single bit for each output port. Each picker sets a bit for each output port that it reserves in each arbitration packet (two in the example of FIG. 4). As each request is placed in a packet, the particulars of that request are transferred to the FIFO being filled for the output queue involved in that request. Thus, in this approach, particulars of the data transfer are not represented in the arbitration packet, but rather directly transferred to appropriate FIFOS of the output queues.

Datapath 35 also operates to provide contents of arbitration packets to output buffers 50*ab*-53*ab*. In one approach, each output port 45-48 is associated with two output buffers. One output buffer is read out while the other output buffer is being filled, as will be explained further below. Numbers of input and output ports, a number of lanes per input port, and a number of pickers servicing the input ports can be varied in implementations according to the disclosure.

FIG. 2 depicts that arbiter 5 also can include a side loader 37 and an overflow buffer 38 that are shown in datapath 35. In some implementations, as will be exemplified by the arbitration example of FIG. 4, pickers 30-32 may not be able to fill all arbitration packets at all times, resulting in null entries (bubbles) from time to time. In one approach, side loader 37 can detect when an arbitration packet completes but still has an empty location, and then attempt to fill that empty location with an entry from buffer 38. Buffer 38 may store lower priority data traffic requests, or in situations where each FIFO 20*ab*-22*ab* includes a limited number of positions, buffer 38 may receive overflow from any of the FIFOs 20*ab*-22*ab*. Side loader 37 can operate similar to a picker, in attempting to identify a location in arbitration packet that can be filled, but does not participate as a peer in the arbitration cycles.

FIG. 2 depicts that each input port includes two input lanes serviced by a single picker, where the picker can select one entry from each lane in an arbitration step. This example illustrates a design choice that balances an amount of work to be performed in a given step with an amount of circuitry and memory to be used in an implementation.

Figure 3:
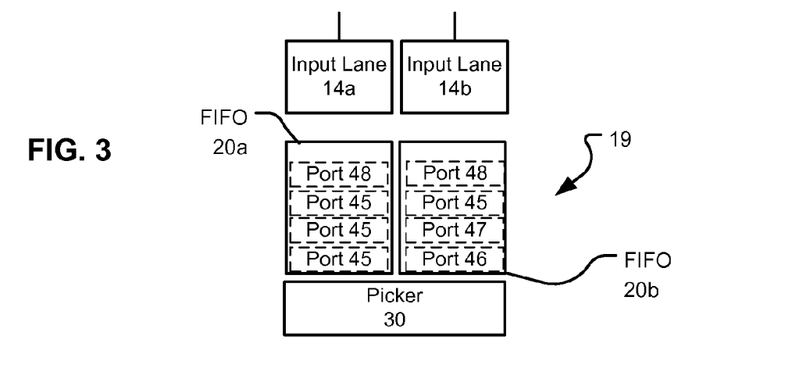
FIG. 3 depicts aspects of an example input port.

FIG. 3 depicts further detail concerning one arrangement 19 for one input port, in which multiple input lanes receive data and store such received data in a respective input FIFO, which is serviced by a picker. In particular, input lanes 14*a*-14*b* store data respectively in FIFOs 20*a*-20*b*, which are serviced by picker 30. FIG. 3 also depicts that each FIFO 20*a*-20*b* stores data representing transactions that require usage of interconnection element 6. Transactions that require the same combinations of ports (or overlapping ports) require arbitration.

Figure 4:
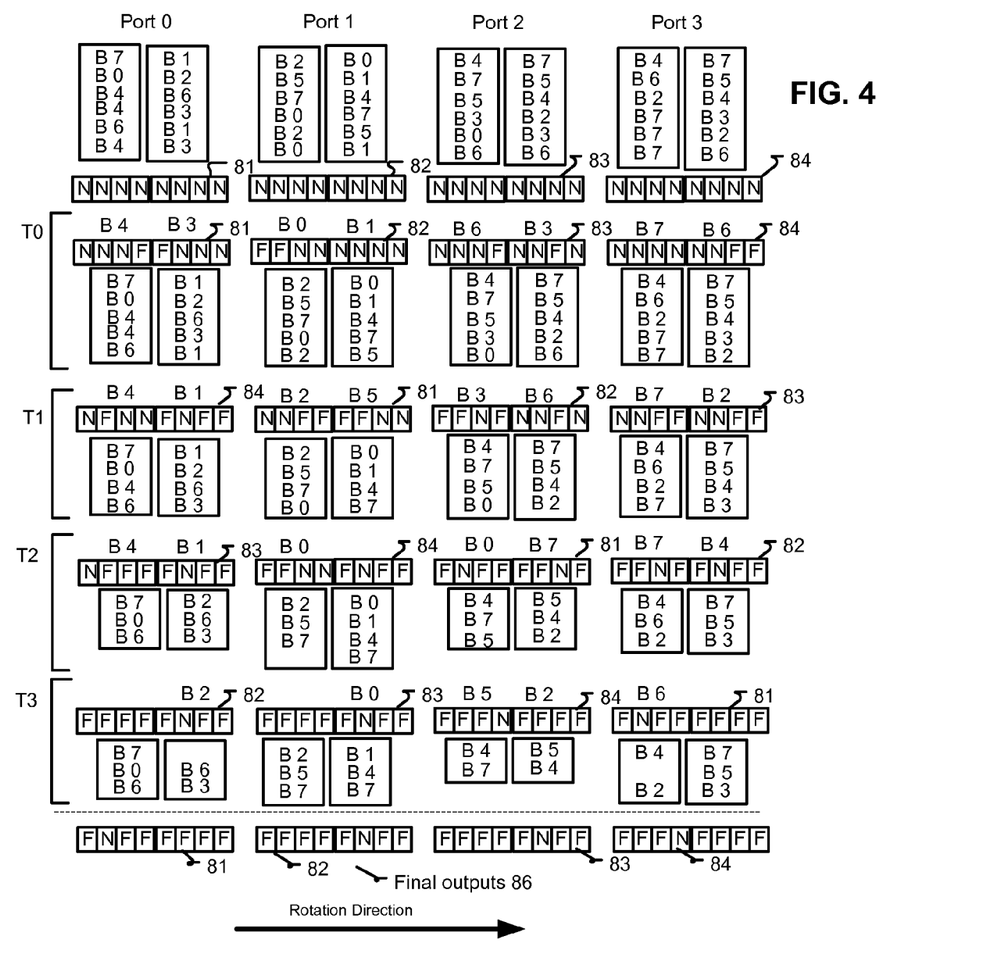
FIG. 4 depicts an example of arbitration for use of the interconnection element.

FIG. 4 depicts an example of how the depicted components of arbiter 5 function. FIG. 4 also is used to illustrate a specific example of the method depicted in FIG. 8. The example of FIG. 4 shows an example where 4 input ports, each having 2 input lanes arbitrate for access to any of eight output ports (In FIG. 4, each output port is referred to as a bank, abbreviated as 'B', such as B0, for Bank 0). As introduced above, the input lanes of each input port are serviced by a respective picker. One arbitration cycle among the 4 input ports proceeds in 4 steps (T0-T4); each step can be an appropriate allocation of processing time in order to perform the tasks required in that step, and does not imply any particular requirement concerning an absolute increment of time. In this disclosure, an arbitration cycle refers to production of a set of arbitration packets that can be used to control an interconnect in a number of subsequent data transfer steps. In the particular example of FIG. 4, an arbitration cycle is completed when each of the four arbitration packets were provided to each picker for an opportunity to place an entry in that arbitration packet. Each time the arbitration packets are transferred from one picker to another can be referred to as an 'arbitration step'.

Figure 8:
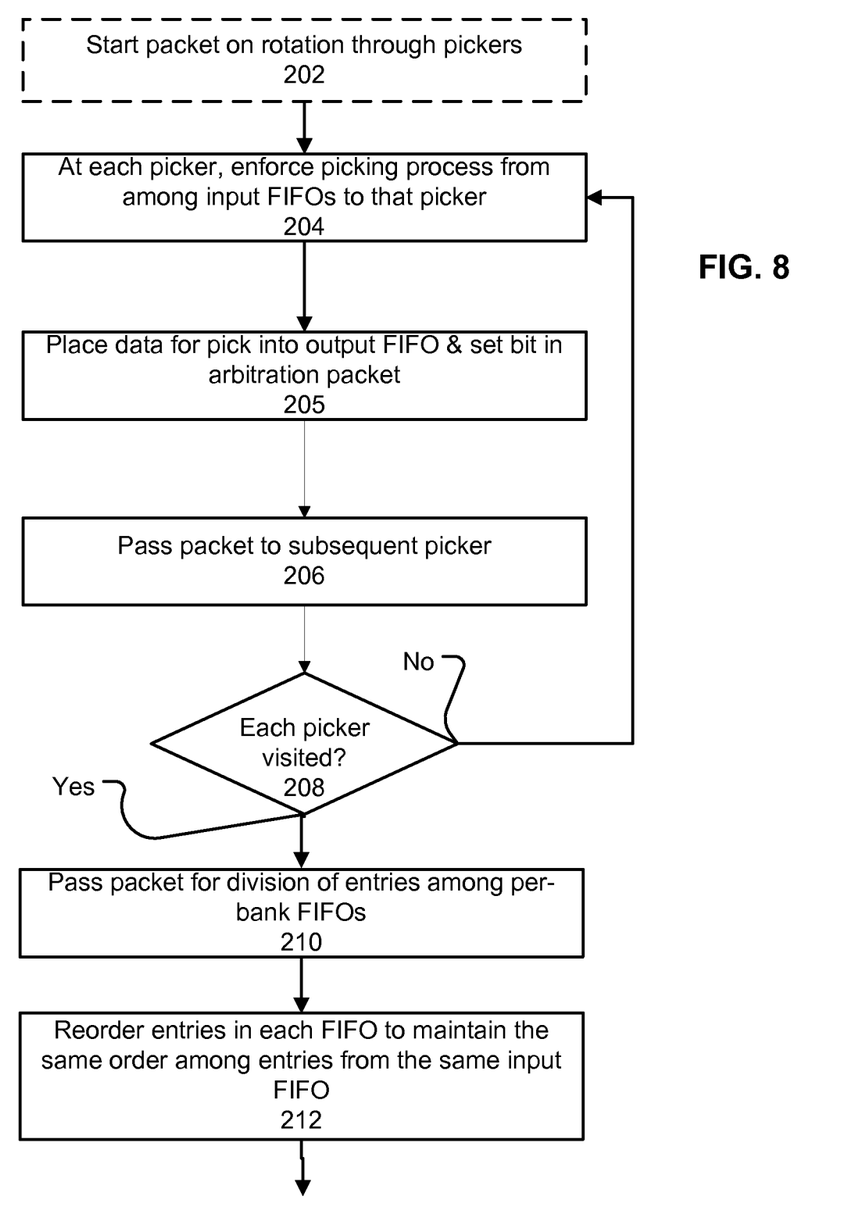
FIG. 8 depicts a flowchart of an example arbitration process.

In order to commence arbitration, a respective empty arbitration packet is started at each picker at T0 (202 of FIG. 8). In an example implementation, each picker is permitted to place up to 2 requests from its associated FIFOs, and in a particular example, one request from each FIFO. In one approach, one FIFO is assigned first priority, among the FIFOs of the input port. This priority can be rotated among the FIFOs, such that for a subsequent arbitration cycle, the priority FIFO will change. In one example, each picker always attempts to place the first entry in each FIFO that can be placed, starting with the priority FIFO. Thus, for empty arbitration packets at T0, each picker is guaranteed to be able to place its highest priority entry from the current priority queue, and would be able to place an entry from the other FIFO as well (if any is available). In FIG. 8, these placement decision operations are collectively identified as 204. FIG. 4 depicts that the arbitration packets are 81-84. For ease of illustration, each arbitration packet 81-84 is segmented into 8 locations, each corresponding to an output bank, where 'N' signifies that a particular location in the arbitration packet is empty and 'F' signifies that it such location is full. FIG. 4 does not imply a requirement that an arbitration packet be laid out in a particular order (e.g., that each output bank have a predetermined relative position in the arbitration packet, as bank identifiers can be included to identify output banks that have been filled). At 205, each picker places the one or more requests identified at 204. The mechanisms involved in such placement can vary in different implementations, and two examples are disclosed herein.

In FIG. 4, FIFOs for each of the input queues are shown to have requests destined for specific output banks (e.g., FIFO 0 of Port 0 has requests B4, B6, B4, B4, B0 and B7.) FIG. 4 depicts which requests are filled (204 select and 205 place, in FIG. 8) by each picker in each time increment directly above the arbitration packet in a state after the operations of the current picker. For example, considering arbitration packet 81 at T0, arbitration packet 81 is empty on arrival. B4 and B3, which are the first entries in each FIFO of Port 0 are filled. Thus, arbitration packet 81 is shown to have the fourth and fifth locations filled. Similarly, arbitration packet 82 is filled for B0 and B1, such that locations 0 and 1 are filled after operation by the picker for Port 1. Each picker performs its operations on the arbitration packet provided to it, which are all empty in T0. So long as each FIFO for each input port has an entry, each picker will place entries in two locations in the empty arbitration packet. Then, at 206 in FIG. 8, the arbitration packet at each picker is passed to a subsequent picker, such that arbitration packet 81 now is at the picker for Port 1, for example. The arbitration packet at Port 3 wraps to Port 1. In FIG. 8, at 208, a check can be done whether each picker has been visited by a given arbitration packet. Here, since that is not the case, the depicted method returns to 204.

In FIG. 4, the picker for Port 0 now has arbitration packet 84, in which locations B7 and B6 are filled (by the picker for Port 3 in the previous step). In a situation where FIFO priority switches each time increment, now the second FIFO for Port 0 has priority to place, and the first entry in this FIFO is B1, which can be placed. When FIFO0 seeks to place, it is discovered that B6 is filled. Now, in one implementation, a search back through FIFO0 is conducted to identify the first entry in FIFO0 that can be placed, which is the second entry, B4. Each picker places two entries from its FIFOs during T1 (204 and 205 in FIG. 8) and again passes (206 in FIG. 8) the arbitration packets 81-84. In T2, the first FIFOs (FIFO0) have priority, and as depicted, each picker places one or more entries.

In FIG. 8, placement of the data representing the pick can include two operations (at 205 in FIG. 8). One operation is setting a bit in the arbitration packet associated with the output port that was picked, and the other is sending transaction information (in an example) to the FIFO being filled for the output port that was picked. This approach represents an implementation where each arbitration packet includes a bit for each output port. When that output port is picked by a picker in a given arbitration step, that bit is set. However, the arbitration packet does not contain information concerning the details of the transaction. Rather, that information is separately transmitted to a buffer associated with the output port. In one example, that information includes a memory address from which information is to be read or to be written, which is destined for, or sourced from the output port. In this implementation, the details of the transactions are not passed in the arbitration packets, and thus an amount of interconnect required and size of registers to hold the arbitration packets is reduced. Also, the circuitry or logic required by each picker is reduced, since the arbitration packet can be masked with a bit mask to identify any unfilled output ports with minimal complexity.

Arbitration packet 84 at Port 1 shows that B0 can be placed from FIFO0, but there is no non-conflicting entry from FIFO1 that can be placed. This situation identifies a limitation of a simpler hardware implementation in which two entries are not placed from the same FIFO, under a situation where one FIFO cannot place an entry. A more complex implementation may allow a picker to select a full allocation of entries from one or more of the FIFOs. Another implementation may determine whether one of the FIFOs cannot place an entry, if the other FIFO goes first (i.e., there is only 1 non-conflicting entry in one of the FIFOs, which conflicts with the first priority entry in the priority FIFO) and adjust placement accordingly. In the above situation, for example, if FIFO1 were allowed to place B0 in arbitration packet 84 in T2, then FIFO0 could place B2. Here, a simpler HW implementation is shown, such that FIFO1 of Port 1 does not place two entries in arbitration packet 84 in T2. Arbitration packets 81-84 continue to be filled according to these examples, as depicted in FIG. 4.

Final arbitration packets are depicted at 86 in FIG. 4. All of the arbitration packets finish on the same arbitration step. Thus, in this example, arbitration requires a step for each input port (in that each input port is given one step to place entries in each arbitration packet) and all pickers operate concurrently. Each arbitration packet is sized to the number of outputs. Thus, the example of FIG. 4 shows a 4 input (where each input has 2 FIFOs or lanes) by 8 output arbitration.

If the arbitration packets include information about the placed transfers, the arbitration packets can be passed, at 210, for division among the per-bank output FIFOs (one such FIFO, where multiple FIFOs are maintained for each bank).

Figure 5:
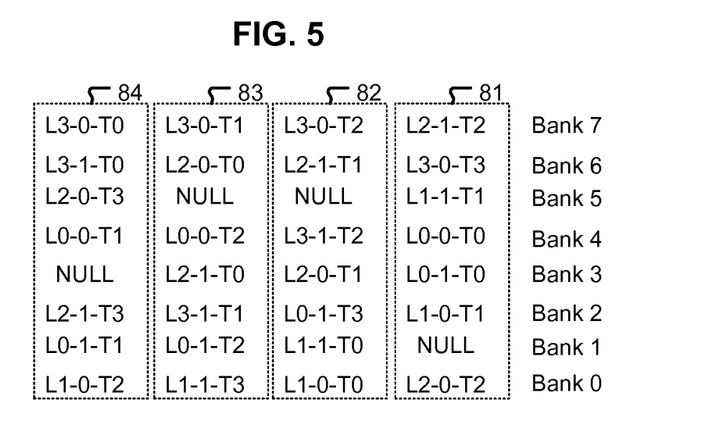
FIG. 5 depicts a per-output queue ordering of arbitration in the example of FIG. 4.

FIG. 5 shows each arbitration packet aligned in an order according to output bank (Bank 0-7). In FIG. 5, the notation is in the form "L#-#-T#". This notation identifies an input port, followed by which FIFO (either 0 or 1), followed by a time when that entry was placed in that arbitration packet. For example, in arbitration packet 81, the Bank 0 entry was from Lane 2, FIFO0, in T2. This notation does not imply that such data is included in the FIFO itself, but rather serves to track how the arbiter placed requests in the example of FIG. 4.

Figure 6:
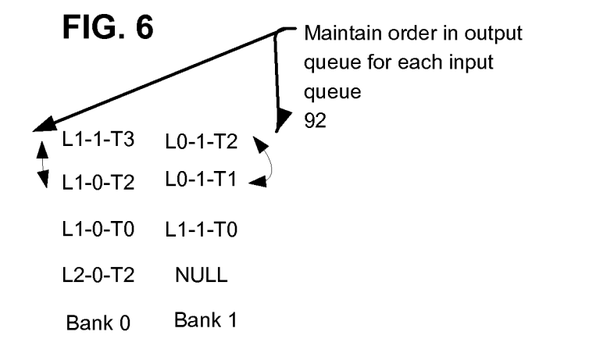
FIG. 6 depicts reordering entries of output queues in order to maintain the same relative order of data transfer requests, by input port.
Figure 7:
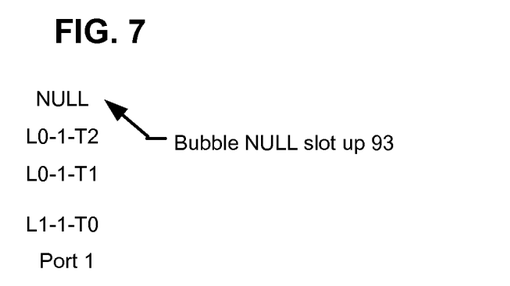
FIG. 7 depicts removing bubbles from leading positions in output queues.

This ordering shows that one side effect of arbitration according to the above disclosure is that entries destined to the same output port, from the same input, may be reordered, relative to the order in the input FIFOs. For example, considering Bank 0, the entry from arbitration packet 83 was placed at T3, but the entry from arbitration packet 84, which is behind arbitration packet 83 was placed at T2. Thus, in one approach, a per output port reordering can be performed (212 in FIG. 8). This reordering can proceed without information from neighboring output ports and only needs to consider status internal to each output port FIFO. FIG. 6 shows reordered entries 92 in Bank 0 and in Bank 1 in response to identifying out of order entries from the same FIFO. Reordering in the output FIFOs also can take place on strictly on a time of selection basis, rather than per-input port reordering. In such approach, the entries in output FIFO are ordered according to pick time only. FIG. 6 also shows that a NULL entry is the first entry in Bank 1. FIG. 7 depicts that a NULL entry can be bubbled 93 to a back of the FIFO; NULL entries also can simply be removed. Depending on implementation of the FIFOs, the remaining entries may or may not be relocated to account for such removal.

Figure 9:
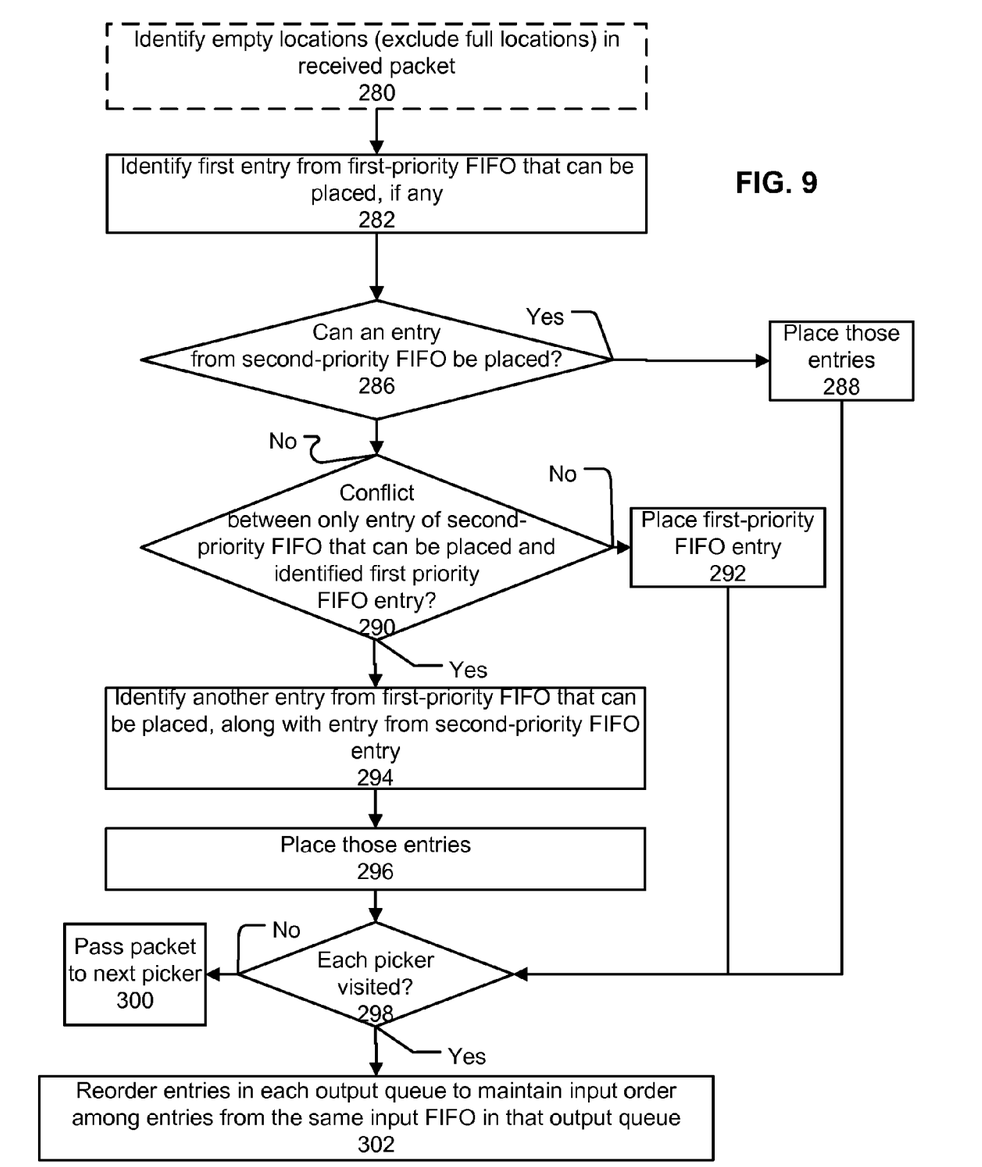
FIG. 9 depicts another example arbitration process.

FIG. 9 depicts another process by which arbiter 5 can conduct arbitration for access to interconnection element 6. At 280, a picker identifies empty locations in a received arbitration packet (full locations excluded). In one example, this means that each arbitration packet supports one entry for each output, although implementations can be constructed to perform differently. For example, different outputs may run at different speeds and therefore a given arbitration packet may have more locations for one output than another. A capacity of outputs can be dynamic, and arbitration packets used for such situations also may implement dynamic adjustments, if desired.

At 282, the first entry from a first-priority FIFO that can be placed is identified (if any). At 286, it is determined whether an entry from the second priority FIFO can be placed. If so, then the entries from the first and second priority FIFOs are placed at 288. Otherwise, it is determined, at 290, whether there is a conflict between an only entry of the second-priority FIFO that can be placed, and the identified first priority FIFO entry. If there is such conflict, then at 294, another entry from the first priority FIFO that can be placed along with the entry from the second priority FIFO is identified. At 296, these entries are placed. At 298, a determination whether each picker is visited is made. If not, then the arbitration packet is passed to a next picker. Otherwise, at 302, reordering of entries for each output FIFO can be performed, as explained above. The example of FIG. 9 shows an approach where more involved intra-port conflict resolution can be conducted. However, this approach also may result in entries leaving input ports out of an order dictated by strict aging, which may be undesirable for some applications. Also, hardware implementing such process may be more complicated.

Another variation on picker behavior can be that a last picker to receive a given arbitration packet can attempt to fill any remaining locations in the arbitration packet. This approach also may lead to more hardware complexity, because the hardware would need to be able to place more entries in the last time segment than previous segments. The last time segment may be made longer, such as to allow up to 3 picks, or more picker hardware may be provided. A probability of increased NULL entries in a given arbitration packet decreases, so there would be diminishing return to allowing an arbitrary number of placements by the last picker, if increased arbitration time or more hardware is required. Sideloader 37 provides an example of an alternate approach to this situation.

Figure 10:
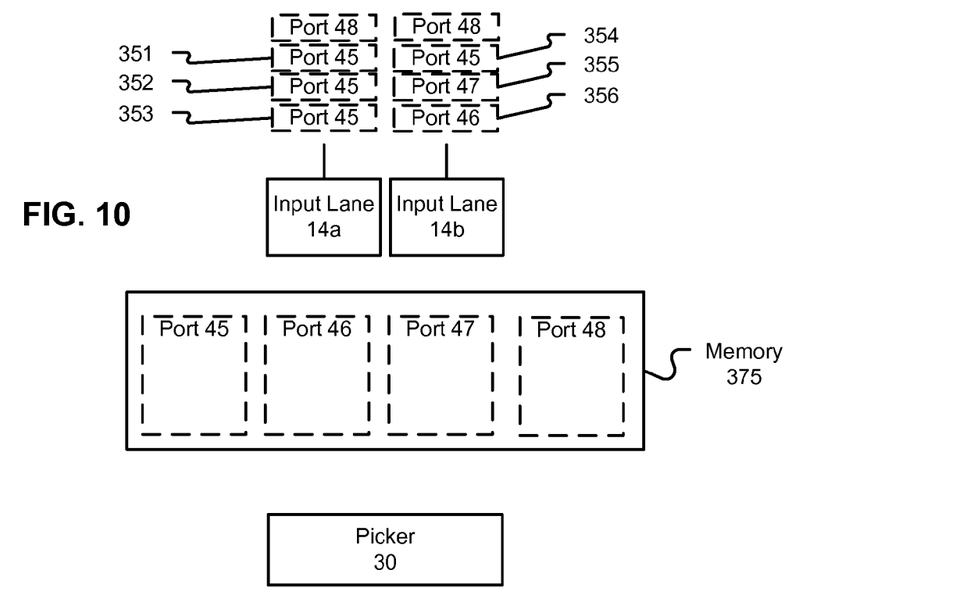
FIGS. 10 and 11 depict aspects relating to another example implementation of the input ports.
Figure 11:
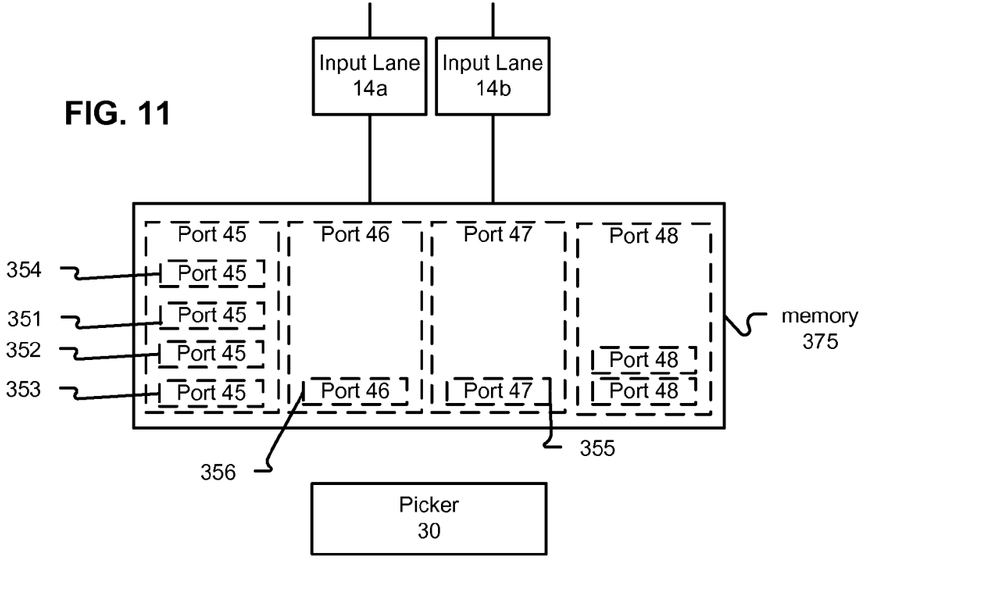

FIGS. 10 and 11 depict another implementation for input ports according to the disclosure. FIG. 2 depicted that each lane of each input port included a respective FIFO that stored an in-order set of requests for all output ports. FIG. 10 depicts that each input port may instead have a memory resource 375 that can buffer segregated lists of requests on a per-output port basis. In particular, each input lane 14*a* and 14*b* still receives a set of requests that may identify any output port (in the general case); and entries 351-356 exemplify this situation by naming different output ports. However, rather than requiring picker 30 to search back through the FIFOs to identify entries that can be placed, the entries can be pre-sorted. FIG. 11 depicts that a memory location in memory 375 stores requests 351-354 all of which identify output port 45, while other requests name different output ports and are thus stored in different sections of memory 375. If desired, a mechanism can be provided to enforce a particular order of placement of entries in memory 375, where multiple entries from different input lanes identify the same output port (e.g. entry 354 and 351). An example of operation of the implementation of FIGS. 10 and 11 is described with respect to FIG. 12.

Figure 12:
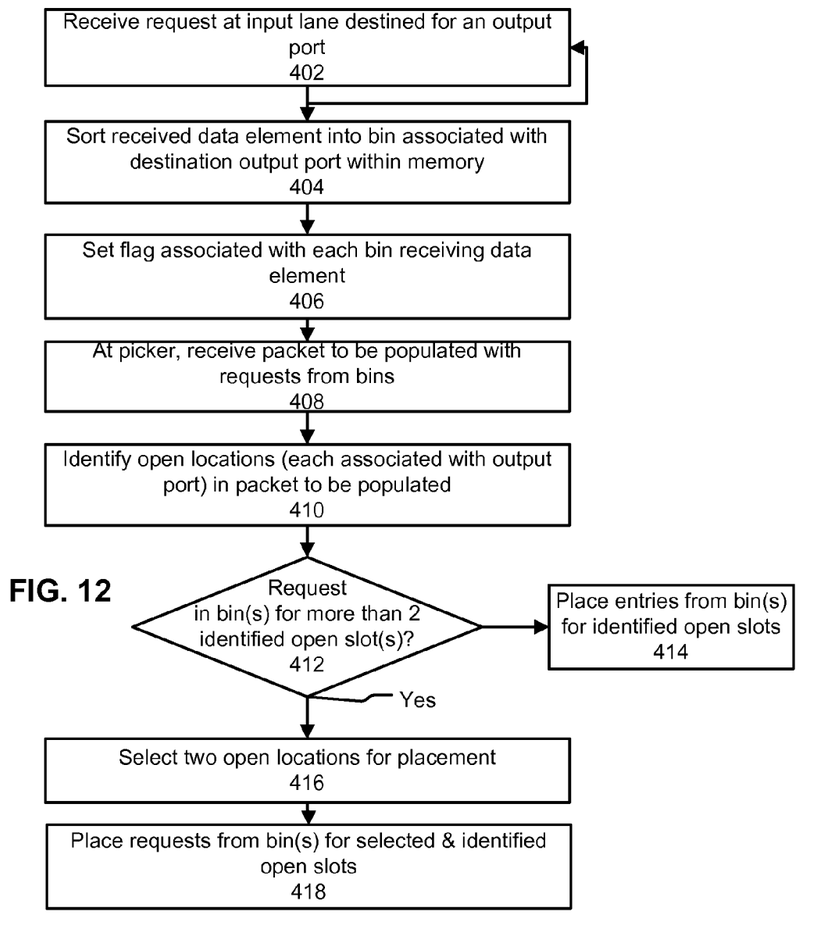
FIG. 12 depicts an example arbitration process that can be used with input ports according to FIGS. 10 and 11.

FIG. 12 depicts an example process of arbitration according to the disclosure, in which each input port pre-sorts entries according to an output port, for use by the respective picker for that input port. At 402, a request is received at an input lane identifying an output port. At 404, that request is sorted to a bin associated with that output port. During such sorting, any of the input lanes can continue receiving further requests. At 406, a flag indicating that a request is awaiting arbitration can be set for the bin to which the request was sorted. This activity can be conditioned, or may make an observable change only on the first time that a request is sorted to a particular bin, or after the bin becomes empty, after requests in that bin have been arbitrated.

At 408, each picker receives an arbitration packet in which one or more requests are to be placed, from the bins. At 410, each picker identifies open locations in its arbitration packet. At 412, a decision whether more than two requests are available to be placed, and if so, then at 416, a process to select two requests from among the available requests is conducted. At 418, those selected requests are placed. Otherwise, at 414, the two or fewer requests can be placed. The above example is based on allowing each picker to select up to two requests to be placed, if possible. Implementations may allow more or fewer requests to each picker and would adjust such number accordingly.

Figure 13:
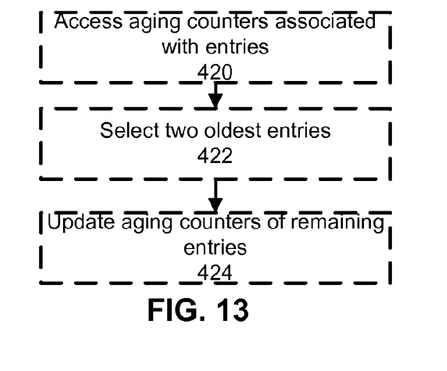
FIGS. 13 and 14 depict example approaches to selecting interconnection requests for placement, from among interconnection requests available in the input port buffer depicted in FIGS. 10 and 11.
Figure 14:
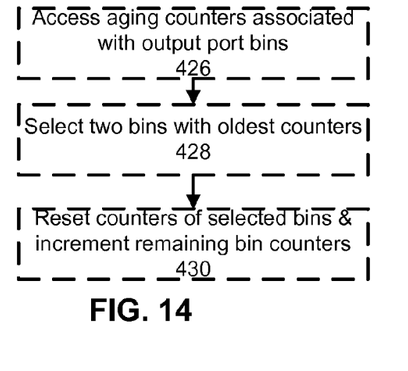

Various processes or other techniques can be used to select the requests to be placed, when there are more requests available than locations (or requests in excess of an allowed placement limit). FIGS. 13 and 14 provide examples of two such processes. In FIG. 13, at 420, aging counters associated with requests in each bin can be accessed, and at 422, two oldest entries can be selected for placement. Aging counters may be provided in a situation where buffering is not implemented in a way that maintains entries in an age-sorted manner. At 424, aging counters associated with remaining entries can be updated. This approach provides per-request aging which may result in excessive overhead for some implementations. FIG. 14 depicts an example where there is per-bin counters. At 426, aging counters associated with each bin are accessed, and two bins are selected that have oldest counters. After selection, at 430, counters on the selected bins are reset and counters on the remaining bins incremented. In this approach, there is a mechanism to maintain selection fairness among bins. Since each bin may store multiple entries, fewer counters would be required. Other implementations of per-bin aging can include a round-robin selection technique, where only bins that have a request to be arbitrated participate in the round-robin. Modifications to round-robin selection may be implemented to handle situations where certain input ports are more active than others, and so on.

Arbiters and interconnects that they schedule can be used in a variety of situations. For example, they can be used to load distributed memories with data elements, where control information used by the arbiter schedules transmission of data from sources (e.g., a processor—see FIG. 1), to an appropriate memory. For example, one application is in the context of distributed computing, such as distributed graphics processing. Distributed graphics processing can include ray tracing. For example, rays can be processed (e.g., rays can be traced for intersection against primitives of a 3-D scene from which a rendering is being made). The arbiter can receive definition data for rays that are to be distributed among the distributed memories, where they can be repeatedly accessed as necessary during ray intersection testing. Other applications include reading data from distributed memories. Thus, the requests for access to the interconnect can be reads, writes, or any combination thereof. Thus, the ports of the interconnect can be used as inputs or outputs.

The disclosure relates to arbitration where each input port of a plurality of input ports will have be guaranteed an opportunity to reserve any output port at least once in an arbitration cycle. One approach to such guarantee is starting an empty arbitration packet at each arbitration participant (e.g. the pickers of FIG. 2) at least once during an arbitration cycle. Additionally, the disclosure describes how each arbitration participant can be given a set of decreasing priority order pick opportunities to any output ports remaining available after higher priority picks are made. In the example of FIGS. 2 and 4, this corresponds to rotating arbitration packets through each of the pickers, so that each picker gets each arbitration packet. However, different arbitration packets arrive at a particular picker after different numbers of picks are made. These approaches contrast with wave front arbitration in that wave front arbitration specifies that a particular combination of input and output ports will be active on a particular data transfer cycle. For example, input 1 is connected to output 2 at the same point in every data transfer cycle.

The examples herein generally described pairs of ports being assigned responsive to requests. However, in some applications, requests can define more complex combinations of ports, such as writing one data element to many locations, writing a set of data elements to specified outputs, and reading data elements from specified locations to a single read port.

Typical implementations may use fixed function hardware, which can allow maximum speed and efficiency in situations where a well-defined set of repetitive interconnect tasks are required. Other implementations can use configurable hardware, or a combination of fixed function and configurable hardware.

In some implementations, interconnect element 6 may be a crossbar, in which any to any connection can be made (e.g., any two ports can be paired for a transfer cycle). A cross bar can be implemented by dedicated hardware. However, in some implementations, the nature of the interconnection element 6 can be abstracted, such that it may be implemented by a bus even though arbiter 5 treats interconnection element 6 as a crossbar. For example, a crossbar of n×n ports can support a maximum of n data transfers in a step. A bus that can support n data transfers in an arbitration step can implement the physical interconnect, and an abstraction layer can be provided that presents a port-based view of the bus to arbiter 5.

Some implementations may use programmable elements to implement aspects of the disclosed arbitration, even though such implementations may be impractical for some applications. If implemented in firmware and/or software, functions may be represented as one or more instructions or code on a computer-readable medium, in one example, the media is non-transitory. Examples include a computer-readable medium encoded with a data structure and a computer-readable medium encoded with a computer program. Machine-readable media includes non-transitory machine readable media. Other kinds of media include transmission media. A non-transitory medium may be any tangible medium that can be accessed by a machine. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a machine.

The description of the aspects and features is provided to enable any person skilled in the art to make and use the systems, apparatuses and perform the methods disclosed. Various modifications will be readily apparent to those skilled in the art, and the principles described in this document may be applied to other aspects without departing from the spirit or scope of the disclosure. Thus, the description is not intended to limit the claims. Rather, the claims are to be accorded a scope consistent with the principles and novel features disclosed herein.

The drawings include relative arrangements of structure and ordering of process components, solely as an aid in understanding the description. These relative arrangements and numbering is not an implicit disclosure of any specific limitation on ordering or arrangement of elements and steps in the claims. Process limitations may be interchanged sequentially without departing from the scope of the disclosure, and means-plus-function clauses in the claims are intended to cover the structures described as performing the recited function that include not only structural equivalents, but also equivalent structures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than, additional to, or less than, those identified herein. Rather, the described features and steps are disclosed as examples of components of systems and methods within the scope of the appended claims.

We claim:

1. A method of arbitrating for access to an interconnect, comprising:
   receiving, over time, one or more data transfer requests, each indicating an input port from n input ports, and an output port of m output ports in an interconnect, through which the request will be serviced;
   buffering each of the requests;
   assigning a respective empty arbitration packet to a respective picker assigned to each of the input ports, each arbitration packet having a location for each of the m output ports;
   at each of the pickers, selecting at least one buffered request and placing each selected request in the arbitration packet at said each picker in the location for the output port indicated by the selected request;

passing the arbitration packets among the pickers until each picker has received each arbitration packet, and while each picker has each arbitration packet, attempting to place at least one request in any remaining location in that arbitration packet; and scheduling fulfillment of the requests using the interconnect according to the placement of the requests in the arbitration packets.

2. The method of arbitrating for access to an interconnect of claim 1, wherein placing each selected request comprises setting a mask bit in the arbitration packet associated with the output port indicated by that request and providing input port information from the selected request to a buffer associated with that output port.

3. The method of arbitrating for access to an interconnect of claim 1, wherein each of the input ports comprises two or more lanes, and wherein the buffering comprises buffering requests coming to each of the lanes in a separate FIFO buffer.

4. The method of arbitrating for access to an interconnect of claim 1, wherein the input port for each request is indicated by which an input port of an arbiter received that request.

5. The method of arbitrating for access to an interconnect of claim 1, wherein the passing comprises activating a circuit to transfer each arbitration packet from a register in one picker to a register in a subsequent picker.

6. The method of arbitrating for access to an interconnect of claim 1, wherein the buffering comprises storing, for access by the respective picker for that input port, each of the requests according to an output port identified in the request and setting a flag indicating availability of a request for that output port.

7. The method of arbitrating for access to an interconnect of claim 1, wherein the interconnect comprises an n input by m output crossbar switch and the method further comprises selectively connecting each of the n inputs of the crossbar switch to one of the m outputs of the crossbar, in subsequent data transfer periods, according to the placement of the requests in the arbitration packets.

8. The method of arbitrating for access to an interconnect of claim 1, wherein the output ports are each associated with memory addresses, and each request includes a memory address from which an output port can be inferred according to the memory addresses associated with each of the output ports.

9. The method of arbitrating for access to an interconnect of claim 8, wherein memory addresses are striped across the output ports.

10. The method of arbitrating for access to an interconnect of claim 1, wherein the placing of each request comprises setting a mask bit corresponding to the location being placed and sending data transfer information to a reorder buffer associated with the indicated output port of that request.

11. The method of arbitrating for access to an interconnect of claim 1, wherein the buffering comprises buffering each request at least until it has been serviced by the picker for the input port through which that request arrived.

12. The method of arbitrating for access to an interconnect of claim 1, wherein each output port has a respective predetermined relative location in each arbitration packet, and placing a request in the arbitration packet comprises filling that location with data pertaining to that request.

13. An arbiter for access to an n input port by m output port interconnect, comprising:
a buffer operable to store requests received at any of the n input ports, wherein m and n are integers of 2 or greater;
a plurality of pickers, each of the pickers coupled to receive an arbitration packet from another picker, the arbitration packet comprising a location for each of the m output ports, to attempt to place a request in at least one empty location in the received arbitration packet, wherein any of the pickers can fill any empty location in the received arbitration packet, wherein the pickers are capable of placing requests in the arbitration packets in a different order than the requests were received at the n input ports, and to pass the arbitration packet to another picker, wherein the plurality of pickers completes n arbitration packets concurrently; and
a respective reorder buffer for each of the m output ports operable to receive the transaction information for that output port and enforce a first-in, first-out order for entries originating from the same input port.

14. The arbiter of claim 13, wherein the plurality of pickers comprises a picker for each of the n input ports.

15. The arbiter of claim 13, wherein each arbitration packet includes a single bit for each of the m output ports, which is set by the picker when filling the location for that output port, and wherein each picker is operable to provide the entries filled in the arbitration packets to the respective reorder buffers for each of the m output ports.

16. The arbiter of claim 13, wherein the reorder buffers for each of the m output ports comprises a plurality of reorder buffers, wherein at least one of the plurality is operable to receive entries from the pickers while the entries from another of the buffers is used to control the interconnect.

17. The arbiter of claim 13, wherein each of the m output ports comprises a plurality of reorder buffers, wherein one of the reorder buffers can be used for controlling an interconnect while another is being filled by the arbiter with transfer information for subsequent requests.

18. The arbiter of claim 13, wherein each of the n input ports comprises a plurality of input lanes, and a single picker is coupled to fill empty locations in the received arbitration packet from each of the input lanes.

19. A method arbitrating for access to a data interconnect, comprising:
providing a non-conflicted opportunity to each of n arbitration participants to reserve usage of any combination of ports available in the data interconnect once every arbitration cycle, wherein each arbitration cycle comprises n arbitration steps, wherein n is an integer of 2 or greater, and
every n arbitration steps produces interconnect control data for n subsequent interconnect data transfers;
providing each of the n arbitration participants n−1 additional decreasing priority opportunities to reserve access to combinations of ports that remain available at the time of each opportunity; and
controlling the data interconnect according to the access reservations made by each of the n arbitration participants during the n arbitration steps in n subsequent interconnection data transfer steps.

20. The method arbitrating for access to a data interconnect of claim 19, further comprising, during the controlling of the data interconnect, repeating the providing steps to produce interconnect control data for n interconnection data transfer steps to follow the interconnection data transfer steps in progress.

21. A computing system, comprising:
an interconnect having a set of ports, and a controller operable to configure the interconnect so that data transactions can occur between specified combinations of the ports, the controller operable to receive a sequence of sets of interconnect configuration data and to configure the interconnect for a sequence of data transfers according to the sets of interconnect configuration data, each set of interconnect configuration data comprising indications of combinations of ports to be coupled during a data transfer cycle when that set of interconnect configuration data is to be used;

an arbiter comprising:
  input ports at which requests for data transactions to occur on the interconnect are received, and
  a plurality of pickers, each picker coupled to a respective input port, and coupled to communicate with a preceding picker and a subsequent picker, each picker for obtaining an arbitration packet during an arbitration cycle, each arbitration packet comprising a predetermined number of slots to be populated with interconnect configuration data, wherein one or more of the slots in the arbitration packet is populated with interconnect configuration data for one or more of the requests received at the input port, the populating comprising identifying any slots that already are populated with interconnect configuration data and excluding from consideration any request that requires a combination of interconnect ports that conflict with combinations of interconnect ports specified by the populated slots, the arbitration packet is transferred to the subsequent picker until each picker has received each of the arbitration packets at least once, an arbitration packet is received from the preceding picker, and the populating is repeated with the received arbitration packet.

22. The computing system of claim 21, wherein each picker is operable to initiate an empty arbitration packet at a beginning of the arbitration cycle.

23. The computing system of claim 21, wherein each input port comprises two or more input lanes, which are serviced by a single picker.

24. The computing system of claim 21, wherein each input port comprises a FIFO buffer for each of one or more input lanes, and wherein the picker is configured to perform the populating by searching, starting from an oldest request in the FIFO buffer, for a request that can be placed in a slot of the arbitration packet.

25. The computing system of claim 21, further comprising a respective output buffer for each output port configured for receiving arbitration configuration data pertaining to that output port, from the arbitration packets, and reordering, as necessary, the arbitration configuration data to respect a per-input port relative ordering of requests.

26. The computing system of claim 21, wherein the arbitration configuration data comprises an indication of a memory location in a memory, at which data is to be read for output to a selected output port of the interconnect.

27. The computing system of claim 21, wherein each arbitration packet comprises a predetermined relatively ordering of the slots according to output port of the interconnect.

28. The computing system of claim 21, wherein a request may include one or more of a read transaction and a write transaction involving a memory unit coupled to an output port of the interconnect.

29. The computing system of claim 21, wherein each combination of the ports is a pair of ports with one port of the pair being an input port and the other port of the pair being an output port.

30. The computing system of claim 21, wherein the set of ports of the interconnect comprises a first subset of ports coupled to interface with respective memory subunits, and a second subset of ports coupled to interface with subsystems that are operable to use the memory subunits for one or more of read and write transactions.

\* \* \* \* \*